(No Model.)  3 Sheets—Sheet 1.

C. WHITNEY.
HARVESTING MACHINE.

No. 334,498. Patented Jan. 19, 1886.

Witnesses.

Inventor.
C. Whitney.

(No Model.) 3 Sheets—Sheet 2.

C. WHITNEY.
HARVESTING MACHINE.

No. 334,498. Patented Jan. 19, 1886.

Witnesses,
Henry Frankfurter,
W. S. Baker.

Inventor,
C. Whitney.

N. PETERS. Photo-Lithographer, Washington, D. C.

(No Model.) 3 Sheets—Sheet 3.
C. WHITNEY.
HARVESTING MACHINE.
No. 334,498. Patented Jan. 19, 1886.
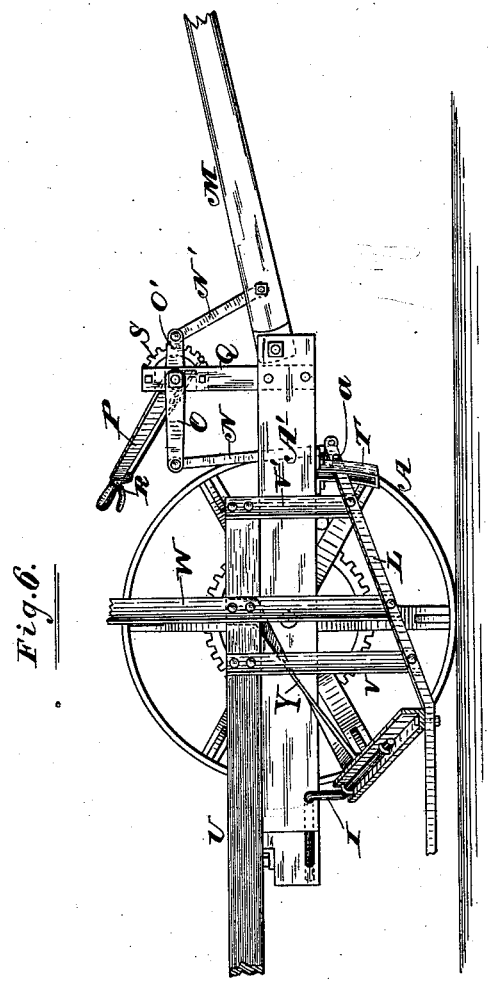
Witnesses, Inventor,
C. Whitney,

UNITED STATES PATENT OFFICE.

CHARLES WHITNEY, OF SYCAMORE, ILLINOIS.

HARVESTING-MACHINE.

SPECIFICATION forming part of Letters Patent No. 334,498, dated January 19, 1886.

Application filed December 12, 1883. Serial No. 114,323. (No model.)

*To all whom it may concern:*

Be it known that I, CHARLES WHITNEY, a citizen of the United States, residing at Sycamore, in the county of De Kalb and State of Illinois, have invented new and useful Improvements in Harvesting-Machines, of which the following is a specification.

My invention relates to harvesting-machines in which the grain is delivered at the rear of the main drive-wheel, and in which the cutting apparatus and grain-receiving platform are placed at an acute angle to the line of draft of the machine, whereby the machine as a whole will be balanced, or nearly so, upon the main driving or supporting wheel, the machine considerably shortened, as compared with other machines, and ample space afforded for the receptacle in which the grain is accumulated while a bundle is being bound and delivered.

The object of my invention is to provide such a machine with mechanism whereby the platform and drive-wheel frame may be tilted simultaneously; to provide a universal-joint connection between the cutter-bar and driving mechanism to permit the varying motion of the main frame and platform; to provide a draft-bar connecting the main frame and platform, and means for simultaneously moving the main frame and draft-bar, whereby the proper tilting of the platform is accomplished; to provide a platform having a pivotal connection with the rear part of the main frame, a draft-bar connecting the platform with the forward end of the main frame, and means for simultaneously moving the main frame and draft-bar in opposite directions to adjust the platform, and to provide a platform and cutting-bar having the same extension, and a draft-bar supporting a reel, and adapted to tilt said reel and platform, all as will hereinafter more fully appear.

The above objects I accomplish by the novel construction and combination of parts hereinafter described and claimed.

Figure 1:
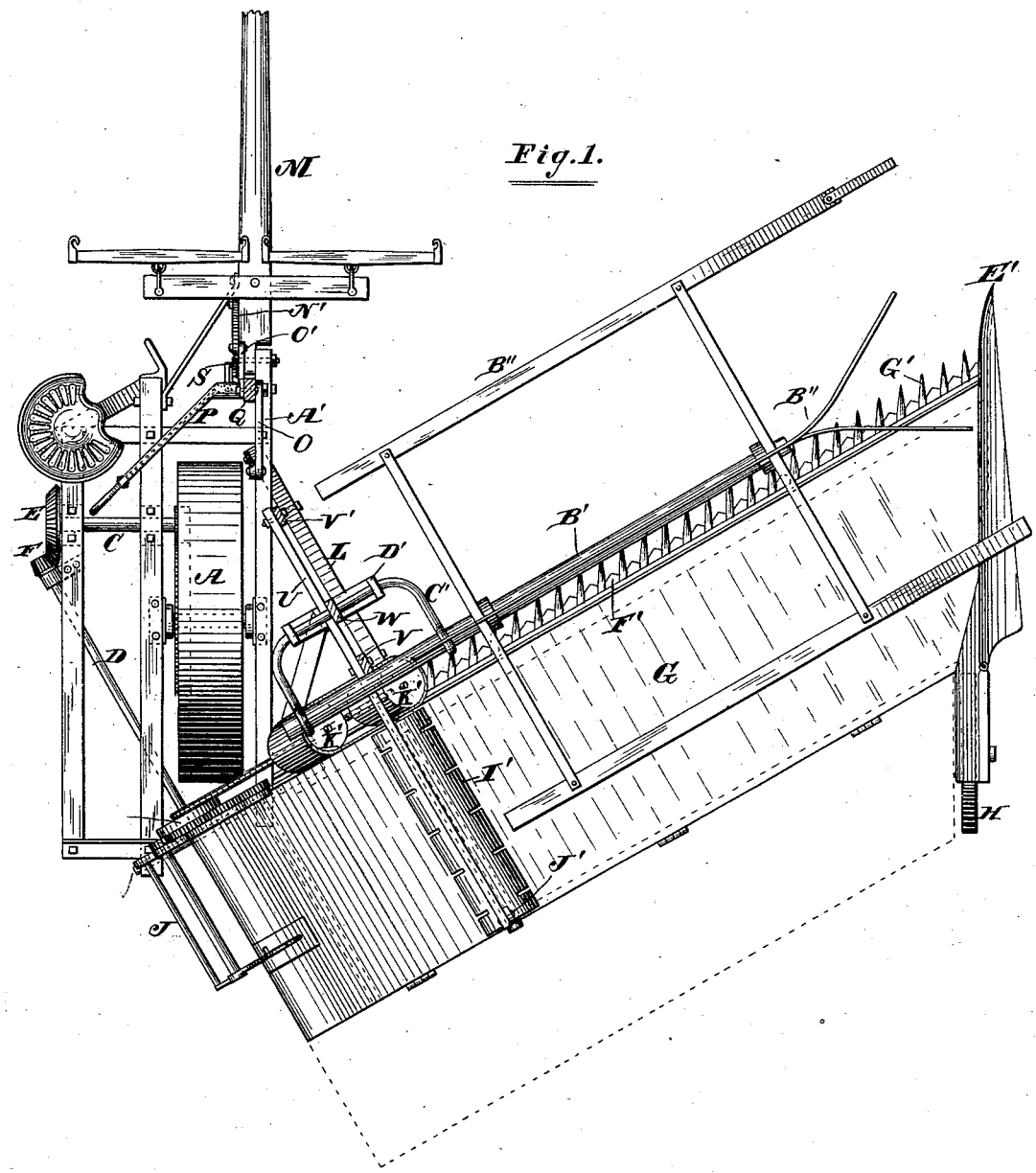
Figure 2:
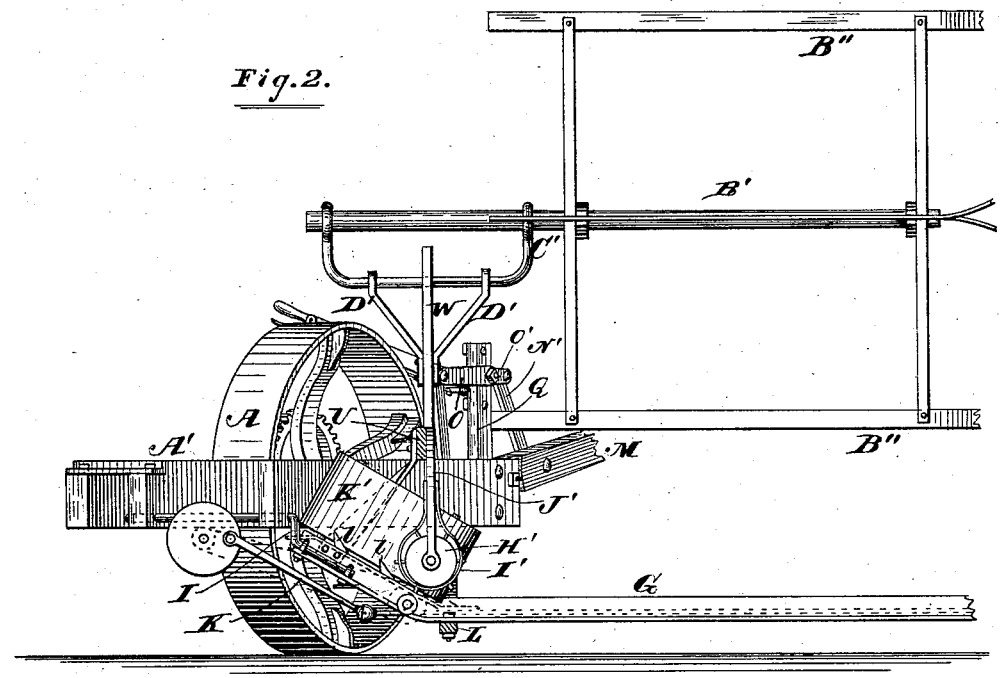
Figure 3:
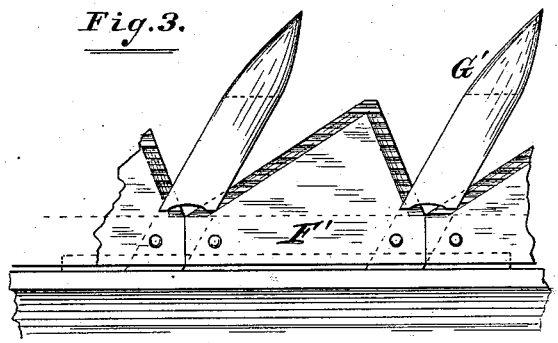
Figure 4:
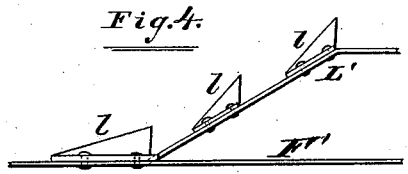
Figure 5:
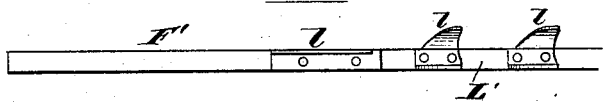

In the accompanying drawings, Figure 1 is a plan view of the machine; Fig. 2, a rear view with outside divider and all that portion in rear of cutter-bar omitted. Figs. 3, 4, and 5 are detail views of certain parts; Fig. 6, a side view of the main frame and wheel, showing the tilting devices.

In the drawings, the letter A designates the main drive or supporting wheel journaled in the main-wheel frame and transmitting motion to parts of the machine from a gear-wheel on its shaft through shafts C and D, provided with bevel-gears E and F. The platform G is supported at one end by the wheel H, and at the other end by a crank-rod, I, journaled so as to turn in the main driving-wheel frame, as shown in Fig. 6. It is connected to the draft-bar L, and is placed at an angle of, say, about thirty degrees to the line of travel of the machine, with the end next to the main frame to the rear of the drive or supporting wheel, so that the grain may be fed therefrom to any suitable binding mechanism, J, at that point, whereby the length of the machine, compared with others which deliver the grain inside the driving-wheel or carry it over the driving-wheel, is lessened. The cutter-bar F' is connected with the platform in the usual manner, and extends along the front edge thereof at the described angle of thirty degrees to the line of draft, and is operated by means of the ball-and-socket or other universal-jointed rod K, connected by a pin to the disk on the end of shaft D, which is at right angles to the cutter-bar. The universal-joint connection permits the platform to adjust itself to the movement of the tilting main drive-wheel frame. While the cutter-bar is at the above-described angle to the line of draft the guards or fingers G' of the finger-bar point in the line of travel of the machine, and since the cutter-bar is at such an acute angle to the line of travel I form the cutting-edge of the blades or cutting-knives next to the main frame of the drive-wheel with a long side and the other edge with a short side, as shown in Fig. 3, so that the cut of the blades or knives of the cutter-bar will be the same or nearly the same in both movements of the cutter-bar. By placing the cutter-bar at the described angle to the line of draft the cutting-surface is much increased, and the cutting accomplished with less power and more ease.

In order to adjust the cutter-bar so as to keep it level or parallel with the surface of the ground, I connect the platform which carries the cutter-bar to the draft-bar L, as shown in Figs. 2 and 6. This bar is connected at its forward end near the forward end of the main frame with the tongue M by means of the lower end of a link-rod, N, which at its upper end is connected to one end of a crank-arm, O, rigidly connected to the lever P, which is mounted on the standard Q, and provided with a spring latch-lever, R, which engages with a notched segment, S, fixed to the standard to lock the lever at any desired point, as commonly done. Another crank-arm, O', is rigidly connected with the lever P, and at its other end is connected to the link-rod N', which is connected to the tongue M. The draft-bar slides in a guide-bracket, T, pendent from the main frame A', and a pin, a, projecting from the side of the bar, bears against the said bracket, so as to prevent the draft-bar from sliding backward longitudinally when depressed by link-rod N. The draft-bar is also connected with the sill U by the vertical posts V V', and a standard, W, for supporting the reel, is also bolted or otherwise secured to the draft-bar and to the sill U, while a brace-bar, Y, extends from said standard and sill to the platform, as shown in Fig. 6. When the lever P is depressed, the forward end of the draft-bar is lowered, and the same end of the main frame of the driving-wheel raised, thus lowering the rear end of the main frame, to which is attached the platform, whereby the cutter-bar is kept parallel, or nearly so, with the ground.

The reel B' turns in the yoke C', connected to the standard W, and braced by the arms D', bolted to the same standard, and revolves parallel with the cutter-bar. By attachment to the standard connected with the draft-bar the reel conforms to the tilting movement of the platform, and may be provided with any of the well-known devices for raising and lowering it, and may receive its motion from the cutter-bar crank-shaft or from the main drive-wheel by means of a driving-chain or a shaft with universal joints and sliding sleeve, all of which are well-known devices, and therefore need not be illustrated or described.

The ends of the reel-beaters B" next to the divider, which is parallel with the line of travel of the machine, are curved, so that the cut grain will be laid upon the platform clear of the divider. By reason of the reel being on the described acute angle to the line of travel of the machine the grain leaning outward or toward the cut grain is much better handled and laid on the platform in better shape to be delivered to the binder. The cut grain thrown upon the platform is delivered to the packer-fingers by means of a chain or canvas belt, and a cylinder, H', with teeth or fingers projecting through a shield, I', all of a well-known construction, and suspended from the sill U by means of a bar, J', is employed to feed the grain up the incline of the platform to the binder; and adjusting devices K', of any approved form, are employed for placing the grain, according to its varying length, to the binder, or by moving the binder forward and back in the usual and well-known manner of doing so for the same purpose.

To assist in moving the butt-ends of the grain along the platform, and to keep the cutter-bar clear at the point next to the main frame, I attach a plate, L', to the cutter-bar upon the proper incline or angle to work upon the angle of the platform next to the main frame, as illustrated in Fig. 4 of the drawings, the said plate being provided with teeth l.

The raising and lowering of the machine is effected by any of the well-known devices for that purpose, and motion is imparted to the several parts by any of the well-known means employed for such purpose. The draft-bar, besides serving to adjust the platform, also serves as a brace or draft-bar, as is obvious.

Having thus described my invention, what I claim is—

1. The combination, in a harvesting and binding machine having rear delivery and balanced upon the main drive-wheel by means of the projection of the cutting apparatus and grain-receiving platform placed at an acute angle to the line of draft, the outer end of the platform projecting forward of the center of the drive-wheel and the other end in rear thereof, of a draft-bar supporting said platform and mechanism for simultaneously tilting the platform and the drive-wheel frame, substantially as described.

2. The combination, in a harvesting and binding machine delivering the grain in the rear of the main drive-wheel, and having the grain-receiving platform placed at an acute angle to the line of draft, of the draft-bar supporting said platform and the lever for simultaneously tilting the platform and main frame, substantially as described.

3. In a harvesting-machine, the combination, with the main frame and a cutter-bar placed at an acute angle thereto, of a universal-joint connection between the cutter-bar and the driving mechanism to permit the varying motions of the main frame and platform, a draft-bar supporting the platform and cutter-bar, and means for simultaneously tilting the grain-receiving platform and the drive-wheel frame, substantially as described.

4. In a harvesting-machine, the combination, with the main frame and a platform, of the draft-bar connecting the platform and main frame, and means for simultaneously moving the main frame and draft-bar, whereby the proper tilting of the platform is accomplished, substantially as described.

5. In a harvesting-machine, the combination of the main frame, the platform having a pivotal connection with the rear part of the main frame, the draft-bar connecting the platform with the forward end of the main frame, and means for simultaneously moving the main frame and draft-bar in opposite directions to adjust the platform, substantially as described.

6. In a harvesting-machine, the combination of the reel extending forward of the drive-wheel axle at an acute angle to the line of travel of the machine, the platform and the cutter-bar having the same extension, and the draft-bar for supporting the reel and tilting the same and the platform, and serving as a draft-bar, substantially as described.

In testimony whereof I have hereunto set my hand in the presence of two subscribing witnesses.

C. WHITNEY.

Witnesses:
JAMES L. NORRIS,
JOS. L. COOMBS.